United States Patent
Bindschedler et al.

(10) Patent No.: US 10,696,847 B2
(45) Date of Patent: Jun. 30, 2020

(54) BINDER OF VEGETABLE ORIGIN, COMPOSITIONS COMPRISING SAME AND METHOD FOR REDUCING THE AMOUNT OF PETROLEUM-BASED BITUMEN

(71) Applicants: SOPREMA, Strasbourg (FR); OLEON SAS, Venette (FR)

(72) Inventors: Pierre Etienne Bindschedler, Strasbourg (FR); Rémi Perrin, Boersch (FR); Christine Robach, Osthoffen (FR); Marion Kerbrat, Margny les Compiegne (FR); Matthieu Chatillon, Compiegne (FR); Franck Raymond, Linxe (FR)

(73) Assignees: SOPREMA, Strasbourg (FR); OLEON SAS, Venette (FR)

( * ) Notice: Subject to any disclaimer, the term of this patent is extended or adjusted under 35 U.S.C. 154(b) by 720 days.

(21) Appl. No.: 15/097,591

(22) Filed: Apr. 13, 2016

(65) Prior Publication Data

US 2016/0304718 A1 Oct. 20, 2016

(30) Foreign Application Priority Data

Apr. 14, 2015 (FR) ..................................... 15 53271

(51) Int. Cl.
| | | |
|---|---|---|
| *C08L 93/04* | (2006.01) | |
| *C08L 95/00* | (2006.01) | |
| *C08L 91/00* | (2006.01) | |
| *C08L 93/00* | (2006.01) | |
| *C09K 3/12* | (2006.01) | |
| *C09D 193/04* | (2006.01) | |
| *C09J 193/04* | (2006.01) | |

(52) U.S. Cl.
CPC ............... *C08L 93/04* (2013.01); *C08L 91/00* (2013.01); *C08L 93/00* (2013.01); *C08L 95/00* (2013.01); *C09D 193/04* (2013.01); *C09J 193/04* (2013.01); *C09K 3/12* (2013.01)

(58) Field of Classification Search
CPC .......... C08L 93/04; C08L 91/00; C08L 93/00; C08L 95/00; C09D 193/04; C09J 193/04; C09K 3/12
USPC .......................................................... 524/66
See application file for complete search history.

(56) References Cited

U.S. PATENT DOCUMENTS

| | | | |
|---|---|---|---|
| 2,362,934 A | 11/1944 | Schlaanstine | |
| 2,510,776 A * | 6/1950 | Gabrielson | ............. C04B 24/34 106/659 |
| 2,620,319 A * | 12/1952 | Rowe | ....................... D06N 1/00 524/362 |
| 2,635,054 A * | 4/1953 | Doyle | ..................... C08L 95/00 106/272 |
| 9,469,784 B2 | 10/2016 | Aerts et al. | |
| 2010/0116171 A1 | 5/2010 | Antoine et al. | |
| 2012/0071597 A1 | 3/2012 | Aerts et al. | |
| 2012/0302672 A1 | 11/2012 | Delfosse et al. | |

FOREIGN PATENT DOCUMENTS

| | | |
|---|---|---|
| EP | 0304767 | 3/1989 |
| EP | 1466878 | 10/2004 |
| EP | 2 610 292 | 7/2013 |
| FR | 2 995 890 | 3/2014 |
| FR | 2 995 891 | 3/2014 |
| GB | 1011260 | 11/1965 |
| WO | 2009/071653 | 11/2009 |

* cited by examiner

*Primary Examiner* — Kelechi C Egwim
(74) *Attorney, Agent, or Firm* — McDonnell Boehnen Hulbert & Berghoff LLP

(57) ABSTRACT

Disclosed is a binder of vegetable origin based on modified tall-oil pitch, modified vegetable resin and optionally oil. Also disclosed are leakproofing membrane compositions, soundproofing membrane compositions, liquid sealing system compositions, asphalt mix coating compositions, asphalt coating compositions, primer compositions, varnish compositions, mastic compositions, adhesive compositions or binder emulsion compositions which comprise said binder. In addition, a method is disclosed for reducing the amount of bitumen of petroleum origin in said compositions.

14 Claims, No Drawings

BINDER OF VEGETABLE ORIGIN, COMPOSITIONS COMPRISING SAME AND METHOD FOR REDUCING THE AMOUNT OF PETROLEUM-BASED BITUMEN

This application claims the benefit of French patent application no. FR 1553271, filed Apr. 14, 2015, the disclosure of which is incorporated herein in its entirety.

The present invention relates to a binder of vegetable origin based on modified tall-oil pitch, modified vegetable resin and optionally oil. The invention also relates to leakproofing membrane compositions, soundproofing membrane compositions, liquid sealing system compositions, asphalt mix coating compositions, asphalt coating compositions, primer compositions, varnish compositions, mastic compositions, adhesive compositions or binder emulsion compositions which comprise said binder and also to a method for reducing the amount of bitumen of petroleum origin in said compositions.

Bitumen of petroleum origin is frequently used to produce leakproofing membranes, in particular for leakproofing roofs, or road surfacings. Indeed, it exhibits advantageous viscoelastic and impermeabilizing properties while at the same time having a relatively low cost price and good stability over time.

A conventional bituminous composition for producing a leakproofing membrane comprises in particular:
- 35% to 87% of bitumen;
- 3% to 15% of polymer;
- 10% to 50% of filler;
- 0.1% to 5% of additives;

said composition being applied as a layer on a fibrous support, for example by coating then calendering so as to result in a prefabricated leakproofing membrane which can in particular be used to leakproof roofs.

A conventional composition for producing a road surfacing comprises in particular:
- 1% to 10% of bitumen;
- 80% to 98% of fillers;

said bitumen possibly being a modified bitumen, i.e. a bitumen comprising at least one polymer. The polymer content in the modified bitumen is conventionally from 0.5% to 6% by weight of polymer relative to the total weight of the bitumen and of the polymer.

Bitumen of petroleum origin is a mixture of hydrocarbons which is obtained after distillation of petroleum. This bitumen, in a pasty or solid form, is liquefiable under hot conditions and adheres strongly to the supports to which it is applied. Since petroleum is a non-renewable fossil resource, it would be desirable, in a perspective of sustainable development, to replace bitumen of petroleum origin with a binder of vegetable origin, all the more so since the increasing worldwide demand for petrol and petroleum-derived products has caused the quality and availability of bitumen of petroleum origin to decrease.

Patent application US 2012/0041117 from S.A. Imperbel N.V. describes a binder of natural origin comprising:
- 14% to 19% by weight of natural oil;
- 4% to 17% by weight of polymer;
- 32% to 40% of resin.

Patent application US 2012/0071597 from S.A. Imperbel N.V. describes a binder of natural origin comprising:
- 1% to 65% by weight of a crude tall-oil pitch;
- 7% to 40% by weight of polymer;
- a filler.

The binders of these two patent applications can in particular be used to produce leakproofing membranes for roofs. However, the membranes obtained with said binders are not satisfactory since they exhibit very substantial degrading of the thermomechanical properties after aging. These mixtures exhibit, in addition, an excessive water uptake.

Also known, from patent application EP 04300190.8 from Colas SA, is a binder of vegetable nature for producing materials for construction and/or public works, which comprises, relative to the total weight of the binder:
- (a) 2% to 98% by weight of at least one natural or modified natural resin of vegetable origin, having a softening point of 30 to 200° C.;
- (b) 98% to 2% by weight of at least one oil of vegetable origin having a viscosity at 25° C. of 50 mPa·s to 1000 Pa·s;
- (c) said binder having:
  - (c1) either a penetrability at 25° C. of 20 to 300 1/10 mm and a softening point of 30 to 75° C.;
  - (c2) or a penetrability at 15° C. of 300 to 900 1/10 mm and a viscosity at 60° C. of 2 to 20 Pa·s; and
- (d) said binder being exempt of any natural or synthetic elastomer and of any thermoplastic polymer.

However, the binder of this application is not suitable for modification by polymers.

Also known, from U.S. Pat. No. 2,362,934 from Hercules Powder Company, is a tile mastic composition comprising a plasticizer, said plasticizer consisting of:
- 60% to 95% by weight of a hardening plasticizer selected from the group consisting of gelled dry oils, crude pitches derived from vegetable oils or crude pitches derived from animal oils and fats;
- 40% to 5% by weight of a material selected from the group consisting of liquid rosin esters and hydrogenated liquid rosin esters.

However, the plasticizer of this application does not have the properties of a bitumen and cannot therefore be used to totally or partially replace bitumen of petroleum origin in compositions for producing membranes or coatings.

After extensive research, the Applicants have developed a binder of vegetable origin which can be used as a replacement for a part or all of the bitumen of petroleum origin in a composition for producing membranes or coatings, such as, in particular, a leakproofing membrane, a soundproofing membrane, a liquid sealing system, an asphalt mix coating, an asphalt coating, a primer, a varnish, a mastic, an adhesive or a binder emulsion. The membranes or coatings obtained with the binder of vegetable origin of the present invention have advantageous properties in particular with regard to elasticity, water uptake, tensile strength, adhesion and stability to aging.

An object of the present invention is thus a binder of vegetable origin comprising:
- 65% to 85%, preferably 70% to 80%, more preferentially 75%, of a plasticizing fraction comprising a modified tall-oil pitch;
- 15% to 35%, preferably 20% to 30%, more preferentially 25%, of a structuring fraction comprising a modified vegetable resin;

the % being % by weight relative to the weight of the binder.

Another object of the invention is a leakproofing membrane composition comprising:
- the binder of vegetable origin of the present invention;
- a polymer;
- a filler;
- optionally an additive.

Another object of the invention is a soundproofing membrane composition comprising:

the binder of vegetable origin of the present invention;
a filler;
optionally a polymer;
optionally an additive.

Another object of the invention is a liquid sealing system comprising:
the binder of vegetable origin of the present invention;
a solvent or polymerizable plasticizer;
an additive;
a prepolymer;
optionally a filler.

A further object of the present invention is an asphalt mix coating composition or asphalt coating composition comprising:
the binder of vegetable origin of the present invention;
a polymer;
a filler and/or aggregates;
optionally an additive.

Another object of the present invention is a primer, varnish, mastic or adhesive composition comprising:
the binder of vegetable origin according to the invention;
solvent;
an additive;
optionally a polymer;
optionally a filler.

Yet another object of the present invention is a binder emulsion composition comprising:
binder of vegetable origin according to the invention;
a surfactant;
a polymer;
water;
optionally an additive.

Finally, an object of the invention is a method for reducing the amount of bitumen of petroleum origin in a leakproofing membrane composition according to the invention or in a soundproofing membrane composition according to the invention or in a liquid sealing system composition according to the invention or in an asphalt mix coating composition or asphalt coating composition according to the invention or in a primer, varnish, mastic or adhesive composition according to the invention or in a binder emulsion composition according to the invention, said method comprising the addition of a binder of vegetable origin according to the invention to said composition as a replacement for a part or all of the bitumen of petroleum origin.

Binder of Vegetable Origin

The binder of the present invention is of vegetable origin, i.e. the compounds that it contains are predominantly obtained from plants, after one or more separation and/or chemical conversion steps.

The binder of the present invention comprises:
65% to 85%, preferably 70% to 80%, more preferentially 75%, of a plasticizing fraction comprising a modified tall-oil pitch;
15% to 35%, preferably 20% to 30%, more preferentially 25%, of a structuring fraction comprising a modified vegetable resin;
the % being % by weight relative to the weight of the binder.

The role of the structuring fraction is to obtain binders which are temperature resistant and which adhere to the support to which they are applied. The role of the plasticizing fraction is to compatibilize the polymers and to ensure good flexibility at low temperature.

Plasticizing Fraction

The plasticizing fraction of the binder of the present invention comprises a modified tall-oil pitch.

Tall-oil pitch is a by-product resulting from the manufacture of paper pulp by the Kraft process. Thus, when conifer wood shavings are treated with a mixture of sodium hydroxide and sodium sulfide under hot conditions, the lignin and the hemicellulose degrade and dissolve in the liquor, whereas the cellulose can be recovered in the form of pulp and then washed. The liquor, which also contains acids in the form of sodium carboxylates, is recovered and concentrated. The foam which forms at the surface of the concentrated liquor is recovered and then acidified under hot conditions with sulfuric acid so as to give the crude tall-oil. The crude tall-oil is then distilled at reduced pressure and the residual non-volatile fraction is the tall-oil pitch. Tall-oil pitch, referenced under CAS No. [8016-81-7], mainly comprises fatty acids such as palmitic acid, linoleic acid and oleic acid; fatty acid esters; resin acids such as abietic acid and isomers thereof, pimaric acid, isopimaric acid and sandaracopimaric acid; resin acid esters; diterpene alcohols; fatty alcohols and sterols. The composition of tall-oil pitch varies depending on the conifer species used and where it comes from. The acidity of tall-oil pitch causes hydrophilicity which penalizes the durability properties and increases the water uptake of the products into which it is introduced. This water uptake causes an incompatibility in terms of use in applications for materials which are long lasting in contact with water.

According to one particular embodiment, the modified tall-oil pitch of the binder of the present invention is obtained by esterification of tall-oil pitch with an alcohol, a polyol or a mixture thereof.

The alcohols and/or polyols used to modify the tall-oil pitch can in particular be of vegetable origin.

Non-limiting examples of alcohols that can be used to modify the tall-oil pitch are alcohols comprising from 1 to 18 carbon atoms, such as, in particular, methanol, ethanol, propanol, butanol, terpene alcohols, fatty alcohols such as lauryl alcohol, myristyl alcohol, cetyl alcohol or stearyl alcohol, and mixtures thereof.

Non-limiting examples of polyols that can be used to modify the tall-oil pitch are terpene polyols, 1,1,1-trimethylolpropane, pentaerythritol, ethylene glycol, diethylene glycol, triethylene glycol, polyethylene glycol, glycerol, dipropylene glycol, tripropylene glycol, 1,3-propanediol, 1,4-butanediol, 1,5-pentanediol, 1,6-hexanediol, neopentyl glycol, and mixtures thereof.

According to one particular embodiment, the modified tall-oil pitch is a tall-oil pitch esterified with triethylene glycol, available from the company DRT under the reference Resinoline DP1202.

According to another embodiment, the modified tall-oil pitch is a tall-oil pitch esterified with a mixture of terpineol and diethylene glycol, available from the company DRT under the reference Resinoline DP1204.

According to one particular embodiment, the modified tall-oil pitch is a tall-oil pitch esterified with diethylene glycol, available from the company DRT under the reference Resinoline DP1201.

According to another embodiment, the modified tall-oil pitch is a tall-oil pitch esterified with a mixture of glycerol and diethylene glycol, available from the company DRT under the reference Resinoline DP1203.

According to another particular embodiment, the modified tall-oil pitch of the binder of the present invention is obtained by thermal decarboxylation of tall-oil pitch.

The thermal decarboxylation of tall-oil pitch can in particular be carried out at a temperature of from 250 to 450° C., in particular from 275 to 375° C., more particularly from 300 to 360° C.

According to one particular embodiment, the modified tall-oil pitch of the binder of the present invention has a residual acidity of less than 40, in particular less than 30, more particularly less than 20 milligrams of KOH per gram of modified tall-oil pitch.

For the purposes of the present invention, the term "residual acidity" is intended to mean the measurement of the acid number which is the number of milligrams of potassium hydroxide required to neutralize the free acidity of one gram of product, as described herein.

According to one particular embodiment, the plasticizing fraction of the binder of the present invention may comprise, in addition to the modified tall-oil pitch, an oil.

The oil of the plasticizing fraction can in particular be an oil of vegetable origin, an oil of animal origin, and mixtures thereof.

For the purposes of the present invention, the term "oil of animal origin" or "oil of vegetable origin" is intended to mean the oils obtained from plants or from animals, either directly or after one or more separation and/or chemical conversion steps.

Examples of vegetable oils that can be introduced into the binder of the present invention are linseed oil, rapeseed oil, sunflower oil, soybean oil, olive oil, palm oil, castor oil, corn oil, grapeseed oil, jojoba oil, sesame oil, walnut oil, hazelnut oil, almond oil, shea butter oil, macadamia oil, cottonseed oil, alfalfa oil, coconut oil, safflower oil, peanut oil and mixtures thereof.

Examples of animal oils that can be introduced into the binder of the present invention are tallow, lard and mixtures thereof.

According to another particular embodiment, the oil of the plasticizing fraction can in particular be selected from saturated polyester oils, unsaturated polyester oils, vegetable oils with a high oleic acid content, and mixtures thereof.

For the purposes of the present invention, the term "saturated polyester oil" is intended to mean the product of reaction between a polyol and two, three or four saturated carboxylic acids.

For the purposes of the present invention, the term "unsaturated polyester oil" is intended to mean the product of reaction between a polyol and two, three or four unsaturated carboxylic acids.

The polyols that can be used for producing saturated or unsaturated polyester oils are 1,1,1-trimethylolpropane, pentaerythritol, ethylene glycol, diethylene glycol, triethylene glycol, tetraethylene glycol, pentaethylene glycol, hexaethylene glycol, glycerol, dipropylene glycol, tripropylene glycol, 1,3-propanediol, 1,4-butanediol, 1,5-pentanediol, 1,6-hexanediol, neopentyl glycol, ethoxylated and/or propoxylated derivatives thereof, i.e. the polyols mentioned above, also comprising —(O—CH$_2$—CH$_2$)— and/or —(—O—CH(CH$_3$)—CH$_2$)— units between the alcohol functions, and mixtures thereof.

The saturated carboxylic acids that can be used for producing saturated polyester oils are linear or branched saturated carboxylic acids having from 8 to 32 carbon atoms.

The unsaturated carboxylic acids that can be used for producing unsaturated polyester oils are linear or branched carboxylic acids having from 8 to 32 carbon atoms and 1 to 6 C=C double bonds.

According to one preferred embodiment, the oil of the plasticizing fraction of the binder of the present invention is a saturated polyester oil.

An example of a saturated polyester oil is sold under the reference Radia 7396 by the company OLEON. Another example of a saturated polyester oil is trimethylolpropane triisostearate sold under the reference Radia 7380 by the company OLEON.

According to one particular embodiment, the plasticizing fraction of the binder of the present invention does not comprise oil and consists essentially of modified tall-oil pitch.

According to another particular embodiment, the plasticizing fraction of the binder of the present invention comprises:

from 50% to 80%, in particular from 55% to 75%, more particularly from 60% to 70%, of modified tall-oil pitch;

from 20% to 50%, in particular from 25% to 45%, more particularly from 30% to 40%, of oil;

the % being % by weight relative to the weight of the plasticizing fraction.

Structuring Fraction

The structuring fraction of the binder of the present invention comprises a modified vegetable resin.

Natural vegetable resin is a viscous liquid which circulates in the resin-producing canals located on the perimeter of resinous trees such as, in particular, trees of the *Pinus* genus. Natural vegetable resin can be obtained by means of an operation known as tapping which is carried out by removing the bark from a small part of the tree, by making an incision into the wood and by harvesting the resin which flows.

Natural vegetable resin comprises terpenes and resin acids. Examples of terpenes that may be included in the natural vegetable resin are bicyclic terpenes such as alpha-pinene, beta-pinene and delta-3-carene; monocyclic terpenes such as limonene and terpinolene; sesquiterpenes such as longifolene and caryophyllene; and mixtures thereof. Examples of resin acids that may be included in a natural vegetable resin are resin acids such as abietic acid and isomers thereof, pimaric acid and isomers thereof; and mixtures thereof.

The mixture of said resin acids, also called rosin, may be the solid residue obtained after distillation of the natural vegetable resin.

The main constituents of the natural vegetable resin, i.e. the terpenes and the resin acids, can also be obtained from by-products resulting from the manufacture of paper pulp by means of the Kraft process. Thus, the terpenes can be obtained by distillation of the liquors from the paper-making industry at reduced pressure and the rosin can be obtained by distillation of the crude tall-oil at reduced pressure.

For the purposes of the present invention, the term "natural vegetable resin" comprises the products resulting from tapping or from the process for manufacturing paper pulp by means of the Kraft process, which comprise terpenes and/or resin acids.

For the purposes of the present invention, the term "modified vegetable resin" comprises the products resulting from the conversion, by chemical reaction, of natural vegetable resin as defined above.

According to one preferred embodiment, the modified vegetable resin of the binder of the present invention is a phenolic terpene resin or a fortified-rosin ester.

For the purposes of the present invention, the term "phenolic terpene resin" is intended to mean a modified vegetable resin obtained by chemical reaction of a terpene or of a terpene mixture with an optionally substituted phenol.

Non-limiting examples of terpenes are monocyclic terpenes, bicyclic terpenes, linear terpenes and mixtures thereof, such as, in particular, alpha-pinene, beta-pinene, delta-3-carene, dipentene, terpinolene, myrcene or alloocimene.

An example of phenolic terpene resin that can be introduced into the binder of the present invention is available from the company DRT under the reference Dertophene DP1104.

For the purposes of the present invention, the term "fortified-rosin ester" is intended to mean a modified vegetable resin obtained by esterification reaction of a polyol with a fortified rosin.

Non-limiting examples of polyols suitable for esterifying fortified rosin are pentaerythritol, 1,1,1-trimethylolpropane, ethylene glycol, di ethylene glycol, triethylene polyethylene glycol, glycerol, dipropylene glycol, tripropylene glycol, 1,3-propanediol, 1,4-butanediol, 1,5-pentanediol, 1,6-hexanediol, neopentyl glycol, and mixtures thereof.

An example of a fortified-rosin ester that can be introduced into the binder of the present invention is available from the company DRT under the reference Granolite DP 1105.

For the purposes of the present invention, the term "fortified rosin" is intended to mean a modified vegetable resin obtained by chemical reaction, of Diels-Alder type, of a rosin with an α-β-unsaturated compound comprising from one to three groups independently selected from carboxylic acid (—COOH) and acid anhydride (—C(O)OC(O)—). The fortified rosin thus has a higher softening point than the corresponding rosin.

Non-limiting examples of α-β-unsaturated compounds comprising from one to three groups independently selected from carboxylic acid (—COOH) and acid anhydride (—C(O)OC(O)—) that are suitable for fortifying rosin are acrylic acid, methacrylic acid, fumaric acid, itaconic acid, sorbic acid, maleic acid, and also anhydride forms thereof.

According to one preferred embodiment, the modified vegetable resin of the binder of the present invention has a softening point above 120° C., preferably above 130° C., more preferentially above 135° C. This is because, when the resin has a softening point that is too low, the resulting binder does not have satisfactory properties in terms of ring-and-ball temperature, needle penetrability at 25° C. and viscosity at 70° C.

The modified vegetable resin of the binder of the present invention can in particular have a residual acidity of less than 80, in particular less than 60, more particularly less than 40 milligrams of KOH per gram of modified vegetable resin.

The binder of the present invention can exhibit properties similar to a bitumen of petroleum origin, such as, in particular, a bitumen belonging to the 35/50 or 70/100 or 160/220 class.

Thus, when the plasticizing fraction of the binder of the present invention consists essentially of modified tall-oil pitch, the binder of the present invention can in particular have a ring-and-ball temperature, as measured according to the method described hereinafter, of from 30 to 58° C. in particular from 35 to 43° C., more particularly from 37 to 40° C.

Furthermore, when the plasticizing fraction of the binder of the present invention consists essentially of modified tall-oil pitch, the binder of the present invention can in particular have a needle penetrability at 25° C., as measured according to the method described hereinafter, of from 30 to 300 tenths of one mm, in particular from 70 to 210 tenths of one mm, more particularly from 170 to 200 tenths of one mm.

The binder of vegetable origin of the present invention can in particular be obtained by mixing the modified tall-oil pitch, the modified vegetable resin and optionally the oil.

Leakproofing Membrane Composition

The leakproofing membrane composition according to the present invention comprises, in addition to the binder of vegetable origin as described above, a polymer, a filler and optionally an additive.

The leakproofing membrane composition according to the present invention can in particular comprise:
  from 40% to 70%, in particular from 45% to 65%, more particularly from 50% to 60%, of binder of vegetable origin according to the invention;
  from 5% to 25%, in particular from 8% to 20%, more particularly from 10% to 15%, of polymer;
  from 15% to 45%, in particular from 20% to 40%, more particularly from 25% to 35%, of filler;
  from 0% to 10%, in particular from 0.1% to 8%, more particularly from 1% to 5%, of additive;
the % being % by weight relative to the total weight of the leakproofing membrane composition.

According to one particular embodiment, the polymer which is part of the leakproofing membrane composition of the present invention is selected from polyolefins, copolymers which comprise ethylene and/or propylene units, vinyl polymers, styrene polymers, polyesters, polyamides, polyurethanes, (meth)acrylic polymers, elastomeric block copolymers, and mixtures thereof.

Examples of polyolefins are polyethylene (PE), polypropylene (PP), atactic polypropylene (APP), isotactic polypropylene (IPP), polyisobutylene (PIB), polymethylpentene (PMP), amorphous poly-alpha-olefins (APAOs), ethylene vinyl acetate (EVA), and mixtures thereof.

Examples of copolymers which comprise ethylene and/or propylene units are ethylene vinyl acetate (EVA), ethylene-propylene (EP or EPM) copolymers and ethylene-propylene-diene (EPDM) terpolymers, and mixtures thereof.

Examples of vinyl polymers are poly(vinyl chloride) (PVC), chlorinated poly(vinyl chloride) (CPVC), poly(vinyl acetate) (PVAC), poly(vinyl alcohol) (PVAL), and mixtures thereof.

Examples of styrenic polymers are polystyrene (PS), acrylonitrile-butadiene-styrene (ABS), styrene-butadiene (SBR), styrene-acrylonitrile (SAN), acrylonitrile-styrene-acrylate (ASA), and mixtures thereof.

Examples of polyesters are poly(glycolic acid) (PGA), poly(lactic acid) (PLA), polyhydroxybutyrate (MB), poly(3-hydroxyvalerate) (P(3HV)), poly(3-hydroxyhexanoate) (P(3-HHx)), polycaprolactone (PCL), polyethylene adipate (PEA), polybutylene succinate (PBS), poly(ethylene terephthalate) (PET), poly(butylene terephthalate) (PBT), polyethylene naphthalate) (PEN), poly(trimethylene terephthalate) (PTT), and mixtures thereof.

Examples of polyamides are polycaprolactam (PA 6), polylauroamide (PA 12), polyundecanamide (PA 11), polytetramethylene adipamide (PA 4.6), polyhexamethylene adipamide (PA 6.6), polyhexamethylene nonanediamide (PA 6.9), polyhexamethylene sebacamide (PA 6.10), polyhexamethylene dodecanediamide (PA 6.12), polydecamethylene sebacamide (PA 10.10), polydecamethylene dodecanediamide (PA 10.12), [NH—$(CH_2)_6$—NH—CO—$(CH_2)_4$—CO]$_n$—[NH—$(CH_2)_5$—CO]$_m$ (PA 6.6/6), [NH—$(CH_2)_5$—CO]$_n$—[NH—$(CH_2)_6$—NH—CO—$(CH_2)_4$—CO]$_m$—[NH—$(CH_2)_6$—NH—CO—$(CH_2)_8$—CO]$_p$ (6/6.6/6.10), polyphthalamides, aramids, and mixtures thereof.

Examples of (meth)acrylic polymers are poly(methyl methacrylate) (PMMA), polyacrylonitrile (PAN), and mixtures thereof.

Examples of elastomeric block copolymers are styrene-butadiene (SB), styrene-butadiene-styrene (SBS), styrene-ethylene-butadiene-styrene (SEBS), styrene-isoprene-styrene (SIS), and mixtures thereof.

Examples of polyurethanes are the products resulting from the reaction between:
- at least one polyol such as, in particular, a polyol of polyether type, for example a polyethylene glycol (PEG), a polypropylene glycol (PPG), a polypropylene glycol glycerol triol or a polytetrahydrofuran (PTHF); a polyol of polyester type, for example the Priplast® 3196 sold by the company CRODA or the Krasol® LBH-p 3000 sold by the company CRAY VALLEY; a polyol of polycaprolactone type, for example the PCP 1000 sold by the company SOLVAY; and mixtures thereof; and
- a compound having more than one isocyanate function, such as, in particular, diphenylmethane diisocyanate (MDI), polymeric MDI, toluene diisocyanate (TDI), a TDI trimer, hexamethylene diisocyanate (HIM), an HIM trimer, isophorone diisocyanate (IPDI), an IPDI trimer, and mixtures thereof.

According to one preferred embodiment, the polymer which is part of the leakproofing membrane composition of the present invention is an elastomeric block copolymer, preferably the polymer is selected from SB, SBS, SIS, SEBS and mixtures thereof.

The polymer which is part of the leakproofing membrane composition of the present invention can in particular have a Shore A hardness, as measured according to standard ASTM D2240, of from 70 to 90, in particular from 75 to 88, more particularly from 80 to 85.

The polymer which is part of the leakproofing membrane composition of the present invention can in particular have a melt flow index (MFI), as measured according to standard ASTM D1238, of less than 1 g/10 min, in particular less than 0.7 g/10 min, more particularly less than 0.5 g/10 min.

The polymer which is part of the leakproofing membrane composition of the present invention can in particular have a polystyrene content of from 20% to 40%, in particular from 25% to 35%, more particularly 29% to 32% by weight relative to the weight of the polymer.

According to one particular embodiment, the filler which is part of the leakproofing membrane composition of the present invention is a mineral or organic filler, such as, in particular, calcium carbonate, silica, talc, dolomite, kaolin, carbon black, titanium dioxide, and mixtures thereof. Preferably, said filler is calcium carbonate. Fillers derived from recycling can also be used (lignin, recycled fibers, ground polymer materials, coke, ground cement materials).

The leakproofing membrane composition of the present invention can optionally comprise an additive. Examples of additives that can be added to said composition according to the invention are flame retardants such as borates or halogenated compounds, root-penetration preventers such as Preventol® B5, antioxidants and rheological agents.

According to one particular embodiment, the leakproofing membrane composition of the present invention comprises less than 10%, preferably less than 5%, more preferentially less than 1% by weight of bitumen of petroleum origin relative to the weight of the composition.

The leakproofing membrane composition of the present invention can in particular be produced by mixing the binder of vegetable origin, the polymer, the additives and the filler.

The mixing step can in particular be carried out at a temperature of from 150 to 200° C., in particular from 160 to 180° C.

The leakproofing membrane can in particular be obtained by applying the leakproofing membrane composition according to the invention while hot to a reinforcement. The membrane solidifies when the temperature returns to ambient temperature. The application temperature can in particular be between 150 and 200° C., in particular from 160 to 180° C. The leakproofing membrane composition can in particular be applied by forming a layer having a thickness of from 1 to 10 mm, in particular from 2 to 6 mm on the reinforcement.

Soundproofing Membrane Composition

The soundproofing membrane composition according to the present invention comprises, in addition to the binder of vegetable origin described above, a filler, optionally a polymer, and optionally an additive.

The soundproofing membrane composition according to the present invention can in particular comprise:
- from 20% to 70%, in particular from 20% to 50%, more particularly from 30% to 40%, of binder of vegetable origin according to the invention;
- from 30% to 80%, in particular from 50% to 75%, more particularly from 55% to 70%, of filler;
- from 0% to 10%, in particular from 2% to 8%, more particularly from 3% to 5%, of polymer;
- from 0% to 10%, in particular from 0.1% to 8%, more particularly from 1% to 5%, of additive;
- the % being % by weight relative to the total weight of the soundproofing membrane composition.

The filler, the optional polymer and the optional additive can in particular be as described for the leakproofing membrane composition.

The process for manufacturing the soundproofing membrane is as described for the leakproofing membrane.

The soundproofing membrane can in particular be obtained by applying the soundproofing membrane composition according to the invention while hot to a reinforcement, as described for the leakproofing membrane.

Liquid Sealing System Composition

The liquid sealing system (LSS) composition according to the present invention comprises, in addition to the binder of vegetable origin described above, solvent or polymerizable plasticizer, an additive, a prepolymer and optionally a filler.

The LSS composition according to the present invention can in particular comprise:
- from 20% to 60%, in particular from 25% to 55%, more particularly from 30% to 50%, of binder of vegetable origin according to the invention;
- from 15% to 30%, in particular from 18% to 28%, more particularly from 20% to 25%, of solvent or polymerizable plasticizer;
- from 0.1% to 10%, in particular from 1% to 8%, more particularly from 2% to 5%, of additive;
- from 30% to 50%, in particular from 32% to 45%, more particularly from 35% to 40%, of prepolymer;
- from 0 to 10%, in particular from 0.1% to 8%, more particularly from 1% to 5%, of filler;
- the % being % by weight relative to the total weight of the LSS composition.

The additive and the optional filler can in particular be as described for the leakproofing membrane composition.

The prepolymer can in particular be a polyurethane obtained by reacting a polyol or a mixture of polyols having a number of OH functions of between 1.5 and 3 with a polyisocyanate or a mixture of polyisocyanates having a number of NCO functions of between 1.6 and 3, the polyol and the polyisocyanate being as defined for the polyurethanes above.

The solvent can in particular be selected from alkanes, cycloalkanes, toluene, xylene, benzene, methyl ethyl ketone, cumene, mesitylene, styrene, diethylbenzene, ethylbenzene, glycol ethers, and mixtures thereof.

The polymerizable plasticizer can in particular be a compound consisting of a hydrocarbon-based chain of which a single end bears more than one isocyanate function, said hydrocarbon-based chain comprising and/or being substituted with an aromatic ring and/or an aliphatic ring, and/or said hydrocarbon-based chain being substituted with at least two hydrocarbon-based chains which can comprise an unsaturation, and the number of isocyanate functions being strictly greater than 1, preferably greater than 1.2, more preferentially greater than 1.5; and less than or equal to 2.2, as described in patent application WO 2013/057429 in the name of Soprema.

The LSS composition of the present invention can in particular be produced by mixing the binder of vegetable origin and the other compounds while hot. The mixing step can in particular be carried out at a temperature from 30 to 70° C., in particular from 40 to 60° C.

The LSS can in particular be produced by spreading the LSS composition directly on the surface to be coated. The coating solidifies by evaporation of the solvent and by crosslinking. The application can in particular be carried out at ambient temperature.

Asphalt Mix Coating Composition

The asphalt mix coating composition according to the present invention comprises, in addition to the binder of vegetable origin described above, a polymer and also a filler and/or aggregates, and optionally an additive.

The asphalt mix coating composition according to the present invention can in particular comprise:
from 1% to 15%, in particular from 2% to 12%, more particularly from 4% to 10%, of binder of vegetable origin according to the invention;
from 0.1% to 1%, in particular from 0.2% to 0.8%, more particularly from 0.4% to 0.6%, of polymer;
from 80% to 99%, in particular from 85% to 96%, more particularly from 88% to 92%, of filler and/or of aggregates;
from 0 to 10%, in particular from 0.1% to 8%, more particularly from 1% to 5%, of additive;
the % being % by weight relative to the total weight of the asphalt mix coating composition.

The filler which can be used in the asphalt mix coating composition according to the invention is as defined above.

According to one particular embodiment, the aggregates which are part of the asphalt mix coating composition of the present invention are selected from sand; dust; gravel and/or pebbles derived from limestone rocks, from sandstone, from quartzite, from gneiss, from granite, from gabbro, from basalt, from andesite; recycling aggregates originating from the crushing of rocks from the recycling of concrete and of dressed stone resulting from the demolition of buildings or roads; industrial by-products; and mixtures thereof.

The asphalt mix coating composition of the present invention can optionally comprise an additive as described above.

The asphalt mix coating composition of the present invention can in particular be produced by mixing the binder of vegetable origin, the polymer and also the filler and/or aggregates while hot. The mixing step can in particular be carried out at a temperature of from 70 to 180° C., in particular from 100 to 150° C.

According to one particular embodiment, the asphalt mix coating composition of the present invention comprises less than 10%, preferably less than 5%, more preferentially less than 1% by weight of bitumen of petroleum origin relative to the weight of the composition.

The asphalt mix coating can in particular be obtained by heating the asphalt mix coating composition according to the invention, by spreading it on the surface to be coated and then by compacting the layer by pressure and vibration. The coating solidifies when the temperature returns to ambient temperature. The application temperature can in particular be from 100 to 250° C., in particular from 150 to 200° C.

Asphalt Coating Composition

The asphalt coating composition according to the present invention comprises, in addition to the binder of vegetable origin as described above, a polymer and also a filler and/or aggregates, and optionally an additive.

The asphalt coating composition according to the present invention can in particular comprise:
from 1% to 15%, in particular from 4% to 12%, more particularly from 6% to 10%, of binder of vegetable origin according to the invention;
from 0.1% to 1%, in particular from 0.2% to 0.8%, more particularly from 0.4% to 0.6%, of polymer;
from 85% to 95%, in particular from 88% to 93%, more particularly from 90% to 92%, of filler and/or aggregates;
from 0 to 10%, in particular from 0.1% to 8%, more particularly from 1% to 5%, of additive;
the % being % by weight relative to the total weight of the asphalt coating composition.

The polymer and the inorganic and organic fillers that can be used in the asphalt coating composition according to the invention are as defined above.

The asphalt coating composition of the present invention can optionally comprise an additive as described above.

The asphalt coating composition of the present invention can in particular be produced by mixing all the components while hot. The mixing step can in particular be carried out at a temperature of from 120 to 250° C., in particular from 140 to 180° C.

According to one particular embodiment, the asphalt coating composition of the present invention comprises less than 10%, preferably less than 5%, more preferentially less than 1% by weight of bitumen of petroleum origin relative to the weight of the composition.

The asphalt coating can in particular be obtained by heating the asphalt coating composition according to the invention and by pouring it onto the surface to be coated. The coating solidifies when the temperature returns to ambient temperature. The application temperature can in particular be from 120 to 250° C., in particular from 140 to 180° C.

Primer, Varnish, Mastic or Adhesive Composition

The primer, varnish, mastic or adhesive composition according to the present invention comprises, in addition to the binder of vegetable origin described above, solvent, an additive, optionally a polymer and optionally a filler.

The primer, varnish, mastic or adhesive composition according to the present invention can in particular comprise:
from 20% to 55%, in particular from 25% to 50%, more particularly from 30% to 45%, of binder of vegetable origin according to the invention;
from 10% to 70%, in particular from 20% to 60%, more particularly from 30% to 50%, of solvent;

from 0.1% to 6%, in particular from 0.5% to 4%, more particularly from 1% to 2%, of additive;
from 0 to 15%, in particular from 1% to 12%, more particularly from 2% to 8%, of polymer;
from 0 to 40%, in particular from 10% to 30%, more particularly from 20% to 25%, of filler;
the % being % by weight relative to the total weight of the primer, varnish, mastic or adhesive composition.

The solvent, the additive, the optional polymer and the optional filler that can be used in the primer, varnish, mastic or adhesive composition according to the invention are as defined above.

The primer, varnish, mastic or adhesive composition of the present invention can in particular be produced by mixing the binder of vegetable origin and the other compounds while hot. The mixing step can in particular be carried out at a temperature of from 30 to 120° C., in particular from 40 to 80° C.

According to one particular embodiment, the primer, varnish, mastic or adhesive composition of the present invention comprises less than 10%, preferably less than 5%, more preferentially less than 1% by weight of bitumen of petroleum origin relative to the weight of the composition.

The primer, varnish, mastic or adhesive is applied to the surfaces and then solidifies by evaporation of the solvent. The application temperature can in particular be from 5 to 40° C., in particular from 10 to 25° C.

Binder Emulsion Composition

The binder emulsion composition according to the present invention comprises, in addition to the binder of vegetable origin described above, a surfactant, a polymer, water and optionally an additive. The binder of vegetable origin is thus dispersed in the aqueous phase in the form of droplets by virtue of the surfactant.

The binder emulsion composition according to the present invention can in particular comprise:
from 20% to 70%, in particular from 30% to 50%, more particularly from 35% to 45%, of binder of vegetable origin according to the invention;
from 1% to 10%, in particular from 2% to 8%, more particularly from 3% to 5%, of surfactant;
from 1% to 10%, in particular from 2% to 8%, more particularly from 2% to 5%, of polymer;
from 30% to 60%, in particular from 35% to 55%, more particularly from 40% to 50%, of water;
from 0 to 10%, in particular from 0.1% to 8%, more particularly from 1% to 5%, of additive;
the % being % by weight relative to the total weight of the binder emulsion composition.

According to one particular embodiment, the surfactant which is part of the binder emulsion composition of the present invention is an anionic, cationic or nonionic surfactant. The surfactant can in particular be a quaternary ammonium comprising a fatty chain.

The polymer can in particular be as defined above.

The binder emulsion composition of the present invention can optionally comprise an additive which can in particular be selected from an antifreeze compound, an adhesion dope, an antifoam compound, a thickener, a pigment, and mixtures thereof.

According to one particular embodiment, the binder emulsion composition of the present invention comprises less than 10%, preferably less than 5%, more preferentially less than 1% by weight of bitumen of petroleum origin relative to the weight of the composition.

The binder emulsion composition of the present invention can in particular be produced by mixing the aqueous phase and the vegetable-origin-binder phase. The aqueous phase is brought to a temperature of 20-50° C. and mixed with the binder phase brought to a temperature of 100-200° C. using an emulsifier (mixing tool).

The binder emulsion composition can in particular be used to produce a tie primer or a road surfacing. To obtain the road surfacing, it is in particular possible to heat the binder emulsion composition and to pour it onto a layer of aggregates as described above placed on the road to be coated. On contact with the aggregates, the emulsion is destabilized, the binder covers the aggregates and the water is gradually evacuated by evaporation. The binder emulsion application temperature can in particular range from 70 to 100° C., in particular from 80 to 90° C.

Method for Reducing the Amount of Bitumen of Petroleum Origin

An object of the present invention is also a method for reducing the amount of bitumen of petroleum origin in a leakproofing membrane composition, a soundproofing membrane composition, a liquid sealing system composition, an asphalt mix coating composition, an asphalt coating composition, a primer composition, a varnish composition, a mastic composition, an adhesive composition or a binder emulsion composition as previously described. This method comprises the addition of the binder of vegetable origin according to the invention to said composition as a replacement for a part or all of the bitumen of petroleum origin conventionally used.

The method according to the invention makes it possible to lower the content of bitumen of petroleum origin in said composition below 10%, preferably below 5% and even more preferentially below 1%. In one preferred embodiment, it makes it possible to eliminate all of the bitumen of petroleum origin.

The invention will be described in greater detail by means of the following examples which are given purely by way of illustration.

EXAMPLES

In the description and the examples below, the following methods were used.

Ring-and-Ball Temperature (RBT) or Softening Point

The RBT (or softening point) is measured according to standard NF EN 1427, June 2007. The test material is placed in copper rings. The rings are placed in an RBTmeter. A metal ball is placed at the surface of the rings which are heated until the ball passes through the ring. The temperature at which the ball passes through is the RBT.

Needle Penetrability at 25° C. (Penetrability)

The penetrability is measured according to standard NF EN 1426, December 1999. The test material is stored at 25° C. and the penetration into the sample, after a period of 5 seconds, of a needle with a diameter at the tip of 0.14 to 0.16 mm, the weight of which with its support is 100 g, is measured with a needle penetrometer. The penetrability is expressed in tenths of one millimeter.

Cold Pliability or Flexibility

The pliability is measured according to standard NF EN 1109, 1999. A test specimen having a thickness of 2 mm is formed with a film drawer. The susceptibility of the test specimen to cracking under the effect of folding at low temperatures is determined. The lowest temperature at which the test specimen can be folded around a mandrel of 30 mm in diameter is thus sought.

Elastic Extension or Set

This is the ability of a material to return to its initial size after having undergone an elongation followed by a relaxation. The set is the residual deformation after relaxation. A test specimen having a thickness of 2 mm is formed with a film drawer. Said test specimen is subjected to a given elongation over 24 h. The test specimen is then placed on a non-stick support for 24 h.

For a mixture having undergone no aging step, the elongation is fixed at 200% for 24 h. For a mixture having undergone accelerated aging for 6 months at 70° C., the elongation is fixed at 25% for 24 h.

Water Uptake

The water uptake is measured in the following way. A test specimen having a thickness of 2 mm is formed with a film drawer. Said test specimen is immersed in water. The test specimen is removed from the water regularly, for example every 2 weeks, dried and weighed. The initial weight before immersion and the weight after immersion are compared. The difference in mass is attributed to a water uptake by the test specimen. The test specimen is placed in water again and this test is reproduced until the mass of the immersed test specimen stabilizes. This test is carried out at ambient temperature.

In the examples below, the following commercial products and acronyms were used:

Resinoline DP1202: tall-oil pitch triethylene glycol ester having a residual acidity corresponding to an acid number of 10 mg of KOH per gram of product and available from the company DRT.

Resinoline DP1204: tall-oil pitch terpineol and diethylene glycol ester having a residual acidity corresponding to an acid number of 10 mg of KOH per gram of product and available from the company DRT.

Dertophene DP1104: modified vegetable resin of phenolic terpene type, said resin having a softening point of 140° C., and a residual acidity corresponding to an acid number of less than 1 mg of KOH per gram of product, and being available from the company DRT.

Granolite DP 1105: modified vegetable resin of fortified-rosin ester type comprising fortified rosin modified by esterification reaction with pentaerythritol, said resin having a softening point of 140° C., and a residual acidity corresponding to an acid number of 45 mg of KOH per gram of product, and being available from the company DRT.

Radia 7396: saturated polyester oil sold by the company OLEON.

Radia 7380: trimethylolpropane triisostearate-based saturated polyester oil sold by the company OLEON.

Kraton® 1186 or T161B: styrene-butadiene-styrene block copolymer respectively sold by the companies KRATON or VERSALIS.

BL200: calcium carbonate having a particle size of between 8 and 200 micrometers.

Example 1

Binder of Vegetable Origin According to the Invention

Modified pitch, modified vegetable resin and optionally oil are introduced into a mixer in the proportions indicated as percentage by weight relative to the weight of the binder in table 1 below. The mixture is heated at 170° C. for 30 minutes.

TABLE 1

|  | Modified tall-oil pitch (%) | Oil (%) | Modified vegetable resin (%) |
|---|---|---|---|
| Binder 1 | Resinoline DP1202 (75%) | — | Dertophene DP1104 (25%) |
| Binder 2 | Resinoline DP1202 (75%) | — | Granolite DP1105 (25%) |
| Binder 3 | Resinoline DP1202 (50%) | Radia 7396 (25%) | Dertophene DP1104 (25%) |
| Binder 4 | Resinoline DP1202 (50%) | Radia 7396 (25%) | Granolite DP1105 (25%) |
| Binder 5 | Resinoline DP1202 (50%) | Radia 7380 (25%) | Dertophene DP1104 (25%) |
| Binder 6 | Resinoline DP1204 (75%) | — | Dertophene DP1104 (25%) |

Table 2 below gives the ring-and-ball temperature (RBT), the needle penetrability at 25° C. (penetrability) of binder 1 and of binder 2 according to the invention and of a bitumen of petroleum origin of grade 160-220.

TABLE 2

|  | Binder 1 | Binder 2 | Bitumen of petroleum origin of grade 160-220 (comparative) |
|---|---|---|---|
| RBT (° C.) | 39 | 38 | 35-43 |
| Penetrability at 25° C. (1/10 mm) | 158 | 153 | 160-220 |

Binder 1 and binder 2 exhibit a behavior similar to a bitumen of petroleum origin having a grade between 70-100 and 160-220. Indeed, these three compositions have a similar RBT and a similar needle penetrability at 25° C. The viscosities of binder 1 and of binder 2 are satisfactory for the applications envisaged.

Example 2

Leakproofing Membrane Composition Comprising the Binder of Vegetable Origin According to the Invention A binder prepared in example 1, a polymer and a filler are introduced into a mixer in the proportions indicated as percentage by weight relative to the weight of the composition in table 3 below. The mixture is heated at 170° C. for 60 minutes.

TABLE 3

|  | Composition 1 | Composition 2 | Composition 3 |
|---|---|---|---|
| Binder (%) | Binder 1 (56%) | Binder 5 (56%) | Binder 6 (56%) |
| Polymer (%) | Kraton 1186 (14%) | Kraton 1186 (14%) | T161B (14%) |
| Filler (%) | BL200 (30%) | BL200 (30%) | BL200 (30%) |

Table 4 below gives the measurements of RBT, penetrability, pliability, set extension and water uptake of composition 1 and composition 3.

TABLE 4

|  | Composition 1 | Composition 3 | Specifications |
| --- | --- | --- | --- |
| RBT (° C.) | 130 | 131 | 120 |
| Penetrability 25° C. (1/10 mm) | 30 | 30 | 20-60 |
| Pliability (° C.) | <−35 | <−35 | <−20 |
| Set extension at 200% (%) | 7 | 7 | <10 |
| Water uptake 35 days after immersion (%) | 1.75 | Not measured | <2% |

According to table 5 below, these compositions also exhibit very good performance levels after aging (24 weeks at 70° C.) according to standard NF EN 1296.

TABLE 5

|  | Composition 1 after aging | Composition 3 after aging | Specifications |
| --- | --- | --- | --- |
| RBT (° C.) | 120 | 119 | 100 |
| Pliability (° C.) | <−15 | <−15 | <−5 |
| Set extension at 25% (%) | 7 | 7 | <10 |

It is understood that the examples and embodiments described herein are for illustrative purposes only. Unless clearly excluded by the context, all embodiments disclosed for one aspect of the invention can be combined with embodiments disclosed for other aspects of the invention, in any suitable combination. It will be apparent to those skilled in the art that various modifications and variations can be made to the present invention without departing from the scope of the invention. Thus, it is intended that the present invention cover the modifications and variations of this invention provided they come within the scope of the appended claims and their equivalents.

What is claimed is:

1. A binder of vegetable origin comprising:
   65% to 85% of a plasticizing fraction comprising a modified tall-oil pitch;
   15% to 35% of a structuring fraction comprising a modified vegetable resin;
   the % being % by weight relative to the weight of the binder
   wherein the modified vegetable resin is a phenolic terpene resin or a fortified-rosin ester,
   the fortified-rosin ester being a modified vegetable resin obtained by esterification reaction of a polyol with a fortified rosin,
   the fortified rosin being a modified vegetable resin obtained by chemical reaction of Diels-Alder type of a rosin with a compound selected from acrylic acid, methacrylic acid, fumaric acid, itaconic acid, sorbic acid, maleic acid, or anhydride forms thereof,
   the polyol esterifying the fortified rosin being selected from pentaerythritol, 1,1,1-trimethylolpropane, ethylene glycol, diethylene glycol, triethylene glycol, polyethylene glycol, glycerol, dipropylene glycol, tripropylene glycol, 1,3-propanediol, 1,4-butanediol, 1,5-pentanediol, 1,6-hexanediol, neopentyl glycol, and mixtures thereof.

2. A binder according to claim 1, wherein the modified tall-oil pitch is obtained by esterification of tall-oil pitch with an alcohol, a polyol or a mixture thereof, or by thermal decarboxylation of tall-oil pitch.

3. A binder according to claim 1, wherein the modified tall-oil pitch has a residual acidity of less than 40 milligrams of KOH per gram of modified tall-oil pitch.

4. A binder according to claim 1, wherein the modified vegetable resin has a softening point above 120° C.

5. A binder according to claim 1, wherein the modified vegetable resin has a residual acidity of less than 80 milligrams of KOH per gram of modified vegetable resin.

6. A binder according to claim 1, wherein said binder has a ring-and-ball temperature of from 30 to 58° C.

7. A binder according to claim 1, wherein said binder has a needle penetrability at 25° C. of from 30 to 300 tenths of one mm.

8. A binder according to claim 1, wherein the plasticizing fraction further comprises an oil.

9. A leakproofing membrane composition comprising:
   the binder of vegetable origin according to claim 1;
   a polymer;
   a filler;
   optionally an additive.

10. A soundproofing membrane composition wherein it comprises:
    the binder of vegetable origin according to claim 1;
    a filler;
    optionally a polymer;
    optionally an additive.

11. A liquid sealing system composition comprising:
    the binder of vegetable origin according to claim 1;
    a solvent or polymerizable plasticizer;
    an additive;
    a prepolymer;
    optionally a filler.

12. An asphalt mix coating composition or asphalt coating composition comprising:
    the binder of vegetable origin according to claim 1;
    a polymer;
    a filler and/or aggregates;
    optionally an additive.

13. A primer, varnish, mastic or adhesive composition comprising:
    the binder of vegetable origin according to claim 1;
    solvent;
    an additive;
    optionally a polymer;
    optionally a filler.

14. A binder emulsion composition comprising:
    the binder of vegetable origin according to claim 1;
    a surfactant;
    a polymer;
    water;
    optionally an additive.

* * * * *